United States Patent [19]
Stankewich, Jr.

[11] 3,764,524
[45] Oct. 9, 1973

[54] PHOSPHOROUS REMOVAL FROM WASTEWATER

[75] Inventor: Michael J. Stankewich, Jr., North Tonawanda, N.Y.

[73] Assignee: Union Carbide Corporation, New York, N.Y.

[22] Filed: Nov. 13, 1972

[21] Appl. No.: 305,726

Related U.S. Application Data

[63] Continuation-in-part of Ser. No. 249,159, May 1, 1972.

[52] U.S. Cl............................ 210/5, 210/7, 210/11, 210/15, 210/18
[51] Int. Cl............................................... C02c 1/10
[58] Field of Search.................................. 210/3–9, 210/11, 15, 18

[56] References Cited
UNITED STATES PATENTS

| | | | |
|---|---|---|---|
| 3,480,144 | 11/1969 | Barth et al............................ | 210/18 |
| 3,547,812 | 12/1970 | McWhirter........................... | 210/7 |
| 3,547,815 | 12/1970 | McWhirter........................... | 210/7 |

OTHER PUBLICATIONS

Eberhardt, W. A., et al., Chemical Precipitation of Phosphorous, etc., Jour. WPCF, Vol. 40, No. 7, pp. 1239–1267 (1968) P.O.S.L.

Eckelberger, W. F., Jr., et al., Waste Water Treatment for Complete Nutrient Removal, Water and/Sewage Works Journal, Oct. 1969, pp. 396–402 (GP. 176).

Mulbarger, M. C., Report to FWQA, "Modifications of Activated Sludge, etc." Aug. 1970. (Paper presented to 432 Conf. of WPCF, Boston Mass., Oct. 4–9, 1970).

Long/et al., Soluble Phosphorous Removal in Activated Sludge Process, Part. I, EPA Project No. 17010 EIP, Aug. 1971.

Primary Examiner—Michael Rogers
Attorney—James C. Arvantes et al.

[57] ABSTRACT

A method for removing both carbon food and phosphorous pollutant by biochemical oxidation and chemical precipitation using oxygen gas in the presence of activated sludge, where most of the carbon food and pollutant are removed in a first covered zone with the addition of phosphorous-precipitating compound and under high food-to-biomass ratio, and the effluent water is further purified in a second covered zone under low food-to-biomass ratio.

15 Claims, 2 Drawing Figures

PHOSPHOROUS REMOVAL FROM WASTEWATER

CROSS-REFERENCE TO RELATED APPLICATION

This application is a continuation-in-part of Ser. No. 249,159 filed May 1, 1972 in the name of Michael J. Stankewich, Jr. entitled "Nitrification of BOD-Containing Water."

BACKGROUND OF THE INVENTION

This invention relates to a method for treating wastewater by oxygenation and chemical precipitation to remove both carbon food and phosphorous pollutants from such water and thereby minimize the latter's oxygen demand and avoid eutrophication of the receiving waters.

Phosphorous and nitrogen compounds which are present in water in appreciable concentrations, are important nutrients. The discharge of large quantities of these nutrients into natural waters promotes the growth of algae and results in eutrophication of lakes and similar deterioration of water quality in receiving streams. Although both nitrogen and phosphorous compounds are essential to the growth of algae, phosphorous is generally considered to be a more critical nutrient because, unlike nitrogen, it can only be supplied by influx of phosphorous-containing compounds entering the receiving body of water. In contrast, certain species of algae, particularly the nuisance blue-greens, are capable of satisfying their nitrogen demand by direct utilization of the atmospheric nitrogen. Thus, control of eutrophication may best be achieved through control of phosphorous.

Phosphorous is usually present in the wastewater in the form of organic phosphorous, inorganic condensed phosphates, and orthophosphates. Most of the organically-bound phosphorous compounds in the wastewater are present as particulate organic matter and as bacterial cells. Very little is known about the dissolved organic phosphorous compounds which are the by-products of bacterial metabolishm and cell lysis. Inorganic condensed phosphates such as tripolyphosphate and pyrophosphate originate mainly in household detergents. Orthophosphate is an end product of microbial degradation of phosphorous-containing organic compounds; orthophosphate is also excreted in urine, and is the product of enzymatic hydrolysis of condensed phosphates. Phosphorous in the orthophosphate form is more readily available for biological utilization. The concentrations of the various forms of phosphorous in domestic wastewater are subject to wide hourly and daily fluctuations. Wastewaters received at or discharged from different plants also contain varying concentrations of phosphates depending on the type of community served and the nature of the biological treatment process employed.

The most widely practiced method of wastewater treatment is biochemical oxidation and in particular the secondary activated sludge system. In recent years this system has been vastly improved by the use of high purity oxygen gas as the oxidant in a series of closed tanks, preferably with staging of gas and liquor from tank to tank in the manner described by U. S. Pat. No. 3,547,515 to J. R. McWhirter.

Recognizing that the objective is to remove all pollutants from wastewater, including the carbonaceous, nitrogenous and phosphorous forms, it is unfortunate that the process steps and conditions best suited to the removal of one pollutant are detrimental to the effective removal of another, so that optimum overall performance may not be achieved in a single treatment step. For example, it has been shown in my above-referenced U. S. patent application Ser. No. 249,159 that the growth rate of carbonaceous consuming microorganisms is far more rapid than nitrogenous consuming forms. As a result, the high sludge wasting rate demanded by the carbonaceous consuming biomass prevents buildup of an effective nitrifying biomass within the same sludge. If phosphorous removal is also practiced, solids production in the system is further augmented and this not only aggravates the depletion of nitrifying microorganisms but also creates a similar maintenance problem for carbonaceous consuming microorganisms.

The requirement that phosphorous be removed in the activated sludge process can impose exceptional problems both to the biological process and to its purification effectiveness. Phosphorous is an essential nutrient for the growth of the microorganisms on which the activated sludge process depends, and a fraction of the phosphorous in the wastewater will be removed by the production and disposition of excess biomass. However, the fraction thus removed is minor and other steps are usually needed in order to meet purity standards. The most practical method for reducing phosphorous content is by chemical precipitation with a metal compound such as aluminum sulfate or ferric chloride.

In phosphorous precipitation, there are other competing chemical reactions within the treatment process which consume a portion of the chemical additive, and dosages substantially in excess of the stoichiometric ratio with phosphorous must be applied in order to obtain desired removals. Regardless of the chemical reaction involved, essentially all of the chemical additive will convert to an insoluble product and therefore a considerable quantity of chemical solids will be produced.

Three basic procedures have been proposed for precipitating phosphorous in association with activated sludge treatment. These procedures are (a) pretreatment by precipitation and removal upstream of activated sludge treatment, (b) post-treatment by precipitation and removal downstream of activated sludge treatment, and (c) combined treatment by precipitation and removal in situ of activated sludge treatment.

Combined treatment is practiced by adding phosphorous-precipitating compounds directly to the mixed liquor in the activated sludge treatment step and thereby removing both carbonaceous matter and phosphorous simultaneously and in the same equipment. Unfortunatly, the combined production of chemical solids (primarily phosphorous salts) and biological sludge is so great that the system is overburdened. In pretreatment or post-treatment, the chemical solid is withdrawn from the point of precipitation and is passed directly to waste. However, in combined treatment, the biological sludge must be retained and recirculated within the system. With combined phosphorous removal, the heavy inert chemical sludge will also accumulate in admixture with the biological solid and may comprise 50 percent of the total solids. The increase in solids wasting in the combined treatment system results in a reduction in the carbonaceous consuming microorganisms in the system with consequent reduction in BOD$_5$-removal capability. The high solids wasting rate necessitated by the more rapid accumulation of the combined solids will also seriously reduce or destroy any nitrification capability of the activated sludge process. The latter effect occurs because nitrifying bacteria exhibit slow growth rates, and any appreciable wasting of sludge will virtually deplete the system of all such slow-growing bacterial species. Finally, the unavoidable accumulation of chemical solids to high levels within the system will impair (rather than aid) flocculation and clarification, and the effluent will become turbid and milky. The effluent suspended solids will increase to perhaps 30–50 ppm., well above levels observed in effluent from modern activated sludge systems without combined phosphorous removal. Control of dosage rates and pH, while effective in preventing turbidity in post-treatment phosphorous removal, will not per se avoid turbidity in combination treatment.

An object of this invention is to provide an improved method for removing both carbon food and phosphorous from wastewater in a combined activated sludge-type system.

Another object of this invention is to provide an activated sludge-type system capable of combined treatment of wastewater to remove carbonaceous, nitrogeneous and phosphorous pollutants. Other objects and advantages of this invention will be apparent from the ensuing disclosure and appended claims.

SUMMARY

This invention relates to a method for treating wastewater by aeration in contact with activated sludge, settling sludge from the aeration and recycling sludge to the aeration zone as the activated sludge wherein the carbon food in the wastewater is biochemically oxidized with at least 50 percent oxygen(by volume) feed gas. In the improvement of this invention wherein phosphorous pollutant is removed, a wastewater feed stream containing carbon food and soluble phosphorous pollutant, at least 50 percent oxygen (by volume) feed gas and first solids recycle are introduced to a first aeration zone having a closed overhead gas space, for mixing and simultaneous recirculation of one fluid against the other fluids. A phosphorous-precipitating compound selected from the group consisting of ferric chloride and aluminum sulfate is also introduced and the aforementioned introducing, mixing and recirculating are at rates such that: (a) insoluble chemical solids are produced including precipitating phosphorous salt, and the phosphorous-precipitating cation/phosphorous pollutant molar ratio is 1.2–1.8, (b) the food/biomass ratio is maintained at 0.8–2.5 pounds BOD$_5$/day × pound volatile suspended solids (MLVSS), (c) the volatile suspended solids concentration (MLVSS) is at least 2,000 ppm., (d) the total mixing and fluid recirculation energy expended in a liquor terminal flow section of said first aeration zone having liquor contact time of at least 10 minutes does not exceed 0.3 horsepower/1,000 U.S. gallons of terminal flow section liquid capacity including a high shear part of said total mixing and recirculation energy not exceeding 0.25 horsepower/1,000 U.S. gallons, (e) the total mixing and fluid recirculation energy expended in the liquor flow section of said phosphorous-precipitating compound introduction does not exceed 0.3 horsepower/1,000 U.S. gallons of said liquor flow section liquid capacity including a high shear part of said total mixing and recirculation energy not exceeding 0.25 horsepower/1,000 U.S. gallons, (f) the dissolved oxygen concentration in said liquor terminal flow section is at least 2 ppm., (g) the pH of said liquor in said first aeration zone is 5.5–7.0, and (h) the total liquor contact time in said first aeration zone does not exceed 180 minutes.

Oxygen-depleted aeration gas of at least 20 oxygen (by volume) content is released from the first aeration zone overhead gas space. Partially oxygenated liquid is also discharged from the first aeration zone and separated into partially treated effluent water still containing at least 25 ppm. BOD$_5$ and unconsumed phosphorous-precipitating cation, and settled solids having a chemical solids/total solids weight ratio of at least 0.25. Part of the settled solids are returned to the first aeration zone as the first solids recycle.

The partially treated effluent water, at least 50 percent oxygen (by volume) feed gas, and second solids recycle are introduced to a second aeration zone having a closed overhead gas space. The fluids are mixed in the second aeration zone and the phosphorous-precipitating cation concentration is maintained therein so that the chemical solids/total solids weight ratio is at least 0.05. Also one fluid is simultaneously recirculated in the two aeration zones against the other fluids, and the aforementioned introductions, mixing and recirculating are at rates such that: (i) additional insoluble chemical solids are formed from the phosphorous-precipitating cation, (j) the food/biomass ratio is maintained at 0.15–0.8 pounds BOD$_5$/day × pound volatile suspended solids (MLVSS) and the ratio of first to second aeration zone food/biomass ratio is at least 2, (k) the total mixing and fluid recirculation energy in the liquor introductory flow section of said second aeration zone having liquor contact time of at least 10 minutes does not exceed 0.30 horsepower/1,000 U.S. gallons of second areation zone liquid capacity including a high shear part of said total mixing and fluid recirculation energy not exceeding 0.25 horsepower/1,000 U.S. gallons, (l) the total mixing and fluid recirculation energy expended in a liquor terminal flow section of said second aeration zone having liquor contact time of at least 10 minutes does not exceed 0.25 horsepower/1,000 U.S. gallons of terminal flow section liquid capacity including a high shear part of said total mixing and fluid recirculation energy not exceeding 0.20 horsepower/1,000 U.S. gallons, (m) the pH of said liquor in said second aeration zone is 5.5–7.0, (n) the dissolved oxygen concentration in said liquor terminal flow section is at least 2 ppm. and (o) the total liquor contact time in said second aeration zone does not exceed 240 minutes.

Oxygen-depleted gas of at least 20 percent (by volume) content is released from the second aeration zone overhead gas space. Further oxygenated liquor is also discharged from the second aeration zone and separated into product effluent water and settled solids having chemical solids/total solids weight ratio of less than 0.25. Part of the settled solids are returned to the second aeration zone as the second solids recycle.

As used herein, the term "BOD$_5$" refers to the biochemical oxygen demand for a given sample measured after a five day incubation period in accordance with the standardized procedure outlined in "Standard Methods for the Examination of Water and Wastewater," American Public Health Association, Inc., New York 1971 (Pages 489–495). Except as specifically indicated, all other measurements set forth hereinafter were made following the standardized procedures outlined in this publication. The $BOD_5$ measurement includes carbon food (appearing as soluble material), non-viable material and carbon-consuming microorganisms (both appearing as volatile suspended solids), but not nitrogen food or nitrogen-consuming microorganisms.

As used herein, the expression "food/biomass ratio" is the ratio of the sum total of the carbon food, non-viable material and carbon-consuming microorganisms to volatile suspended solids, i.e., pounds $BOD_5$/day × pound volatile suspended solids (MLVSS) in an aeration zone. Also as used herein the term "chemical solids" refers to the inorganic solids formed as a result of adding the phosphorous-precipitating compound to the first and second aeration zone. These inorganic solids include the ferric or aluminum cation from the added compound and the anion may for example include the phosphorous pollutant, or the chemical solid may be an oxide or hydroxide of the cation. The term "total solids" refers to the mixture of both chemical solids (as defined above) and the suspended solids normally present in the activated sludge process which are of a biological, carbonaceous origin, plus inert solids in the wastewater feed.

This invention realizes the aforestated objects and as compared to prior art activated sludge systems, tests have demonstrated that this method is capable of removing substantially all the aforesaid wastewater contaminants in tankage whose total volume is no greater than the volume required for equivalent treatment in a single step high purity oxygen system, but without phosphorous removal.

Figure 1:
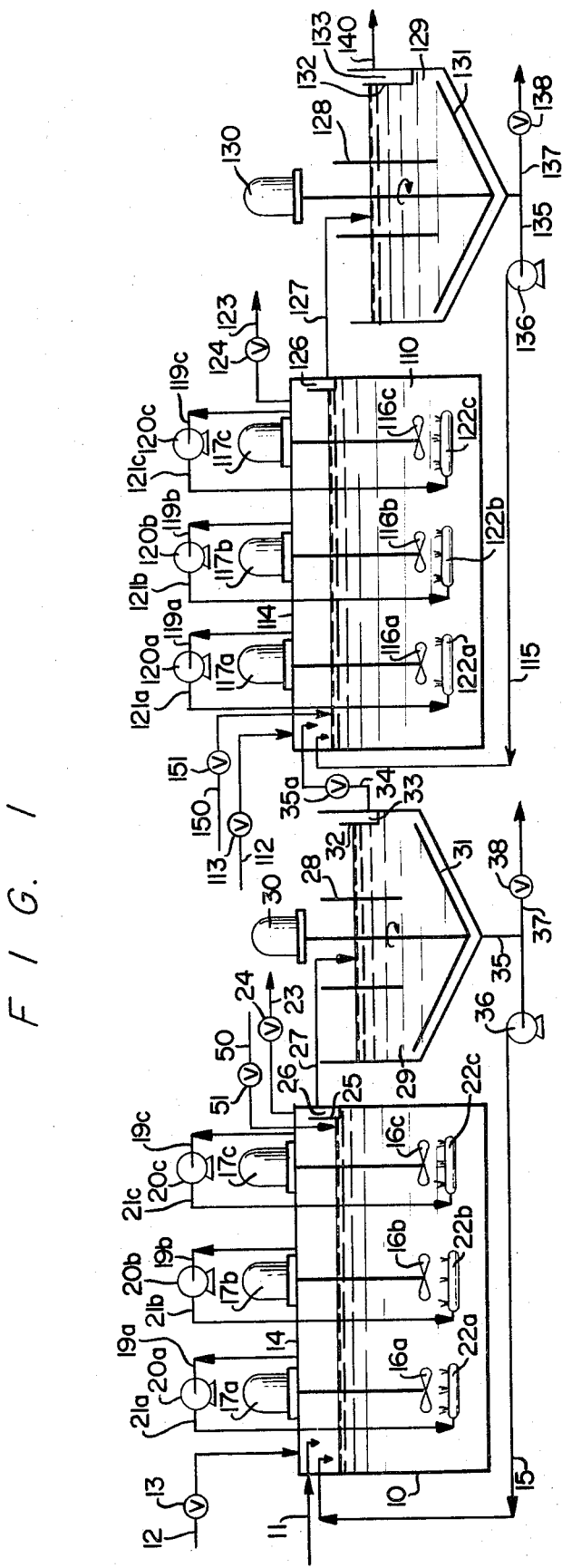
FIG. 1 is a schematic view taken in cross-sectional elevation of apparatus capable of practicing one embodiment of the invention wherein the first and second aeration zones employ single gas-liquor contact zones approaching "plug flow" conditions.

Although the liquor is preferably staged through a series of sub-zones in the first aeration zone, the latter may be a non-partitioned chamber wherein the liquor is completely mixed, as for example described in U. S. Pat. No. 3,547,812, to J. R. McWhirter, incorporated herein to the extent pertinent. In this embodiment, the aforementioned total energy expended/1,000 U.S. gallons liquid capacity ratio for the liquor terminal flow section of the first aeration zone applies to the entire zone.

DESCRIPTION OF PREFERRED EMBODIMENTS

United States Pat. No. 3,547,812 issued Dec. 15, 1970 to J. R. McWhirter describes an improved system for biochemically treating BOD-containing water by at least 60 percent (by volume) oxygen gas in contact with active biomass (activated sludge) to form liquor. The mixing is continued while simultaneously maintaining: (a) the oxygen feed gas to mixing plus gas-liquor contact energy ratio at 0.03–0.40 lb. moles oxygen per horsepower hour of energy supplied, (b) the aeration gas above the liquor at oxygen partial pressure of at least 300 mm. Hg but below 80 percent oxygen (by volume) while consuming at least 50 percent (by volume) of the feed gas oxygen in the liquor, (c) the dissolved oxygen concentration of the liquor at below 70 percent of saturation with respect to the oxygen in the aeration gas but above about 2 ppm. and (d) continuously recirculating one of the aeration gas and liquor fluids in intimate contact with the other of the fluids in the aeration zone. Oxygenated liquor is thereafter withdrawn from the aeration zone and preferably separated into cleaned effluent water and activated sludge, a portion of the latter being recycled to the aeration zone.

U.S. Pat. No. 3,547,815 issued Dec. 15, 1970 to J. R. McWhirter describes another improved system for biochemically treating BOD-containing water by at least 50 percent (by volume) oxygen gas in contact with active biomass. In this McWhirter gas-staged system, the oxygen feed and other fluids are mixed and one fluid is simultaneously continuously recirculated in a first gaseous oxygen stage to form first oxygenated liquor and first unconsumed oxygen-containing gas. The latter is discharged from the first stage and mixed with aqueous liquid-solid in a second stage and one of the fluids is also continuously recirculated against the other fluids in the second stage. Although only two gas stages are essential, it is often desirable to provide additional gas stages and operate same in a manner analogous to the first two stages. If the system is within an enclosed chamber, it is also preferred to flow the oxygenated liquor from stage-to-stage cocurrent (in the same direction as) the gas staging.

Both of these oxygen biochemical treatment systems offer important advantages as compared with conventional air aeration of wastewater, for removal of carbon food. The advantages for example include smaller aeration equipment, lower power costs, lower capital investment, lower sludge handling costs and less land space. However, these systems have the same previously enumerated disadvantages as air aeration systems when used for combined removal of carbon food and phosphorous pollutants. The high sludge wasting rate reduces the $BOD_5$/removal capability and also the nitrification capability if the objective is to remove all such pollutants from the wastewater.

It has now been discovered that these problems can be overcome by a two step method in which the wastewater is first treated in a first aeration zone using oxygen gas as taught by the referenced McWhirter patents, to remove at least a major portion (typically 80 percent for municipal sewage in the high food/biomass ratio embodiment) of the wastewater oxygen demand due to carbon food (as measured by customary $BOD_5$ determination). A phosphorous-precipitating compound selected from the group consisting of ferric chloride and aluminum sulfate is also introduced for mixing with the first aeration zone liquor. These compounds are soluble in wastewater, produce trivalent cations in solution, and the cationic portion has an affinity for phosphorous pollutants so as to form insoluble phosphorous salts therewith. The added water soluble compounds also form acid solutions by hydrolysis. The aluminum sulfate, $Al_2(SO_4)_3$, n $H_2O$, will hereinafter be referred to as "alum" and the commercial grade of alum containing minor quantities of impurities has been found quite satisfactory in the practice of this invention. Alum usually includes 14 or 18 molecules of water bound in the crystalline form. Sodium aluminate, $NaAl(OH)_x$, is not a suitable phosphorous-precipitating compound because at the conditions prevailing in aeration zones with closed overhead gas space and high purity oxygen gas, sodium aluminate forms basic solutions and impairs flocculation of the chemical solids.

To obtain complete precipitation of the phosphorous pollutant, it is necessary to introduce a relatively large stoichiometric excess of phosphorous-precipitating cation, i.e., the $Al^{+3}$ or $Fe^{+3}$ cation/phosphorous pollutant molar ratio is 1.2–1.8. For purposes of this relationship, "phosphorous pollutant" comprises all phosphorous contained in the wastewater which is analytically detectable by the method specified in the previously referenced "Standard Methods for the Examination of Water and Wastewater." In particular, the non orthophosphate forms of phosphorous pollutant are first converted to the ortho form by the persulfate digestion method described in the 13th edition, page 526, and the ortho phosphate determination is made using the aminonaphtha-sulfonic acid method described in the 12th edition, page 231.

The phosphorous-precipitating compound is introduced in a liquor flow section (either in the first aeration zone or between this zone and its clarifier) where the total mixing and fluid recirculation energy is relatively low to avoid mechanical damage to the phosphorous-precipitating floc particles, i.e. where the total energy expended does not exceed 0.30 horsepower/1,000 U.S. gallons of the liquor flow section liquid capacity including a high shear part of the total mixing and recirculation energy not exceeding 0.25 horsepower/1,000 U.S. gallons. Excessive attrition will cause dispersion of floc particles and result in poor clarification even in normal practice of the activated sludge system without phosphate removal. When phosphorous-precipitating compounds are employed within the mixed liquor aeration zone, the chemical-biological floc particles are much more susceptible to mechanical damage and dispersion.

In the high purity oxygen aeration gas systems described in the aforementioned McWhirter patents, energy is needed to both mix the liquor to keep the solids in suspension and recirculate one fluid against the other fluids within the closed aeration zone to promote mass transfer between gas and liquid. The energy needed for a particular system depends on such factors as the $BOD_5$ content of the wastewater, the type of mixing-fluid recirculation equipment used, the biodegradability of the wastewater, and the food/biomass ratio. For example, if a surface impeller is used to perform both the mixing and fluid recirculation functions, the power needed to achieve satisfactory solids suspension and oxygen dissolution is relatively high. Moreover, the surface impeller is a high shear device and imposes greater damage to floc particles than other devices. Another suitable mixing-fluid recirculation assembly is a sub-surface rotating sparger for introducing the oxygen gas with a mixing propeller positioned above the impeller, preferably on the same shaft and also below the liquor surface. In this assembly the gas is withdrawn from the overhead space by a pump and returned to the sparger. Only the sparger arms produce high shear on the solids and the major portion of the energy consumed by the rotating assembly is to operate the propeller which is a low-shear device producing very little floc damage. Still another efficient fluid recirculation-mixing system is the combination of a surface impeller and a submerged propeller, wherein the surface impeller is sized and powered solely to perform the liquor-against-gas recirculation function while the submerged propeller performs the liquid-solids mixing. As in the case of the rotating sparger, the surface impeller is a high shear device while the bottom propeller is low shear. It should be noted that the chemical solids produced in phosphorous removal are relatively heavy and difficult to hold in suspension. The power required for liquid-solids mixing is significantly higher when phosphorous salts are precipitated in the manner of this invention, than when phosphorous removal is not practiced.

Biodegradability of the wastewater affects power requirements. If the wastewater is readily degradable, the oxygen demand nearer the feed end of the first zone will be relatively high and a relatively steep decline in power requirement might be expected between wastewater feed and effluent ends of the first aeration zone. If the wastewater is not readily biodegradable, reaction rates will be slower and the power (and oxygen) requirement will tend to be spread more uniformly from end-to-end of the first aeration zone.

Since the major part of the chemical and biological solids are produced in the first aeration zone, the energy requirements in the second aeration zone are lower and the biological reaction rates are lower.

As previously indicated, the first and second aeration zones may comprise single aeration chambers, and the basic geometry may be advantageously chosen to simulate plug flow with the liquid (liquid-solid) continuously moving from the wastewater inlet end to the effluent end. This relationship simulates plug flow and suppresses back-mixing along the chamber length. In this event, a series of liquid-solid mixing means are preferably spaced along the liquid-solid flow path. However, in the preferred practice of this invention, each zone is divided into a multiplicity of separate sub-zones with all feed fluids introduced to a first sub-zone of the first aeration zone for mixing and simultaneous fluid recirculation therein to form a first partially oxygenated liquor and a first oxygen-depleted aeration gas. These fluids are separately withdrawn and each introduced to a second sub-zone for further mixing and simultaneous fluid recirculation to form a second partially oxygenated liquor and second further oxygen-depleted aeration gas. The fluids are also separately withdrawn from the second sub-zone and each introduced to any remaining sub-zones of the first aeration zones for further mixing and fluid recirculation in the same cocurrent flow direction as the first and second sub-zones. In this embodiment the phosphorous-precipitating compound is preferably introduced to the final sub-zone of the first aeration zone. The second aeration zone is preferably arranged and constructed to provide for cocurrent flow from the inlet to the effluent end in an analogous manner. In this staged flow embodiment, mixing and fluid recirculation means are needed in each sub-zone.

As used herein, the expression "liquor terminal flow section" of the first aeration zone refers to the end from which the partially oxygenated liquor and oxygen-depleted aeration gas are discharged for the staged liquor and semi "plug-flow" embodiments. In the completely mixed liquor embodiment, there are no sub-zones. Conversely, the "liquor introductory flow section" of the first aeration zone refers to the opposite end at which the wastewater, first solids recycle and at least 50 percent oxygen feed gas are introduced. The "liquor terminal flow section" of the second aeration zone refers to the effluent end of that zone from which the further oxygenated liquor and oxygen-depleted aeration gas are discharged. The "liquor introductory flow section" of the second aeration zone refers to the opposite end at which the partially treated effluent water, at least 50 percent oxygen (by volume) feed gas and second solids recycle are introduced. When the aeration zone in question is divided into sub-zones, the liquor introductory flow section is the first sub-zone to which the wastewater or partially treated effluent water is introduced, and the liquor terminal flow section is the last sub-zone from which the partially oxygenated liquor or further oxygenated liquor is discharged.

One requirement of this invention is that the total mixing and fluid recirculation energy expended in the liquor terminal flow section having liquor contact time of at least 10 minutes does not exceed 0.3 horsepower/1,000 U.S. gallons of first aeration zone liquid capacity. Moreover this energy includes a high shear part which does not exceed 0.25 horsepower/1,000 U.S. gallons. This energy includes that necessary to drive the motors which in turn power any surface impellers, sub-surface propellers, rotatable spargers, and gas recirculation pumps. It does not include the energy needed to separate air (to form the oxygen aeration gas), and drive the gas and liquor from the introductory flow section to the terminal flow section of the first aeration zone. The expression "liquor contact time" refers to the total period a particular quantity of liquor (liquid-solid) is mixed with oxygen gas. It is based on the wastewater plus solids recycle passing through a particular liquor flow section, and is calculated by dividing the flow section volume by the liquor flow rate therethrough. For example, if the liquor flow rate through the terminal flow section is 10 million gallons/minute, the volume of the terminal flow section is 0.14 million U.S. gallons, and the energy input comprises 35 high-shear horsepower for a surface impeller and 7 low-shear horsepower for a submerged propeller, the total mixing and fluid recirculation energy is 0.30 horsepower/1,000 U.S. gallons liquid capacity and the liquor contact time in the terminal flow section is 20 minutes. The aforementioned numerical limits represent the maximum energy levels which can be tolerated by the combined chemical-biological (total) solids without sustaining excessive dispersion so as to prevent effective settling in the clarifier. The energy level must usually be at least 0.08 horsepower/1,000 U.S. gallons capacity in order to maintain the solid in uniform suspension.

The use of oxygen-rich aeration gas (as distinguished from air) permits operation within this power range. Moreover, the oxygen demand in the terminal flow section of the first aeration zone is substantially less than in the introductory flow section and less energy must be expended in the terminal zone for fluid recirculation (needed for mass transfer). A low energy terminal flow section in the first aeration zone will provide opportunity for reconstitution of floc which may have been damaged in upstream sections of the zone where oxygen demand is higher. In a preferred embodiment, the total mixing and fluid recirculation energy expended in the first aeration zone liquor terminal flow section does not exceed 0.25 horsepower/1,000 U.S. gallons including a high shear part of such energy not exceeding 0.20 horsepower/1,000 U.S. gallons.

As previously indicated, the phosphorous-precipitating compound is introduced in a liquor flow section where the total mixing and fluid recirculation energy is relatively low, i.e., does not exceed the maximum allowable in the liquor terminal flow section. It is preferably though not necessarily introduced to the liquor terminal flow section. Since the precipitation reaction is very rapid, the phosphorous-precipitating compound may be added to the effluent channel which transports the partially oxygenated liquor from the terminal flow section to the clarifier. Usually this channel is an open trough without mechanical mixing so that the energy level due to gravity flow is well below the aforementioned maximum energy level.

The food/biomass ratio in the first aeration zone is maintained at a relatively high level of 0.8–2.5 pounds $BOD_5$/day × pound MLVSS and the volatile suspended solids concentration is maintained at least at 2,000 ppm. These parameters are most readily controlled by varying the speed of the pump recycling first solids from the first clarifier to the feed end of the zone. This is because the wastewater feed rate in a treatment plant is usually not controllable although it usually varies considerably during a 24 hour period. The food/biomass ratio is of course related to both volume of the aeration zone and wastewater strength. For a given wastewater flow rate and $BOD_5$ strength, and a given concentration of volatile suspended solids under aeration, the food/biomass ratio is inversely related to the liquor contact time in the aeration zone. This high food/biomass ratio in the first zone is needed to insure that the partially oxygenated effluent water entering the second aeration zone has been only partially depleted of its carbon food in the first aeration zone, i.e., still contains at least 25 ppm. $BOD_5$ and unconsumed phosphorous-precipitating compound.

Whereas the use of high food/biomass ratios on the order of 0.8–2.5 pounds $BOD_5$/day × lb. MLVSS are reported in air aeration systems to result in poor settleability and low density return sludge, the use of at least 50 percent oxygen in the first aeration zone of this system under such high F/M values results in good settleability and high density first solids recycle. Accordingly, high total mixed liquor solids concentration (MLSS) can be achieved with low first solids recycle/wastewater volume ratios in the first zone, even at high F/M values. This permits a significant reduction in liquor contact time and reactor volume.

It should be noted that the relatively high food/biomass ratio maintained in the first aeration zone requires a relatively low total liquor contact time, i.e., not exceeding 180 minutes based on combined wastewater and first solids recycle.

Nitrification (the assimilation of nitrogen food by nitrogen-consuming bacteria) will usually not occur to any appreciable extent in the first aeration zone. The high food/biomass ratio and the precipitation of chemical solids result in a relatively high yield of excess total solids from the first aeration. As a result the nitrifying bacteria are wasted at too high a rate to sustain a significant concentration of these forms in the biomass. The dissolved oxygen concentration in the liquor terminal flow section is maintained at least at 2 ppm. to insure a sufficient driving force for the biochemical oxidation.

To obtain the high degree of solids removal from the partially treated effluent water in the second aeration zone (discussed hereinafter in detail) the liquor pH must be maintained in the range of 5.5–7.0 in both the first and second zones, and preferably in the range of 5.5–6.5 With air aeration, the normal pH of liquor undergoing treatment is relatively high, e.g., 7.0 to 8.0, and acids such as sulfuric must be employed to depress the pH to within the foregoing optimum range. The cost of chemicals to modify the pH is significant, and expensive controls are required in order to monitor and adjust flows of acid in accordance with fluctuating pH value and buffering capacity of the incoming wastewater. However, in the oxygen aerated activated sludge system employing a multiplicity of sub-zones each with a closed overhead gas space, the pH of the mixed liquor is inherently maintained within the range desired for phosphate precipitation and pH-adjusting chemicals are usually not required. The lower pH characteristic of oxygen aerated mixed liquor is due to the high content of carbon dioxide maintained within the recirculated fluids. The $CO_2$ content, and hence the pH, is controllable by regulating the rate at which $CO_2$-laden aerating gas is vented and replenished with fresh oxygen. In the air system, the $CO_2$ is continually stripped from the liquid by the once-through flow of a very large volume of air.

A preferred characteristic for the first aeration zone is a liquor introductory flow section having liquor contact time of at least 10 minutes for high-rate cell synthesis and $BOD_5$ removal by virtue of mixing the carbon food-containing wastewater and the carbon-consuming bacteria containing first solids recycle and oxygen absorption from the aeration gas. Also, the total liquor contact time (for wastewater plus first solids recycle) in the first aeration zone does not exceed 180 minutes. One reason for the latter requirement is that the first aeration zone must be operated in a manner such that the partially oxygenated effluent water is incompletely treated and in fact contains at least 25 ppm. $BOD_5$ and unconsumed phosphorous-precipitating compound.

The partially oxygenated liquor is discharged from the liquor terminal flow section of the first aeration zone and separated into the aforementioned partially treated effluent water and settled solids having a chemical solids/total solids weight ratio of at least 0.25 and preferably less than 0.50. This ratio depends upon the $BOD_5$; phosphorous pollutant and non-viable solids concentrations in the wastewater, along with the previously discussed process variables. For example, it has been determined that with a wastewater feed stream containing 205 ppm. $BOD_5$, 10 ppm. soluble phosphorous pollutant, 72 ppm. non-biodegradable solids, an aluminum cation/phosphorous molar ratio of 1.3, food-to-biomass ratio of 1.25, 25 ppm, residual $BOD_5$ in partially treated effluent water, a cell yield coefficient of 0.6 (lbs. biological solids produced/lb. $BOD_5$ removed), and 0.57 lbs. chemical solids produced/lb. dry alum added, the chemical solids/total solids weight ratio of the settled solids from the first aeration zone will be about 0.35 in a staged oxygen aeration system. However, if the phosphorous pollutant concentration in the wastewater feed is only 6 ppm. and the other previously enumerated factors remain constant, the chemical solids/total solids weight ratio will only be about 0.25. In locations where the phosphorous pollutant concentration is higher than 10 ppm. with the other factors constant, the chemical solids/total solids weight ratio of the settled solids may approach 0.50, especially if sufficient phosphorous-precipitating cation is added for the cation/phosphorous pollutant molar ratio to approach 1.8.

The chemical solids content of the settled solids from the first aeration zone cannot be readily determined by methods outlined in the previously identified "Standard Methods for the Examination of Water and Wastewater" for determining total solids (MLSS) and volatile solids (MLVSS). This is because heating the sample from 105°C. (the MLSS test temperature) to 550°C. (the MLVSS test temperature) not only volatilizes the organic solids but also drives off at least a substantial portion of the bound water of the chemical solids. The residue after baking at 550°C. contains not only the feedwater non-biodegradable solids but also the dehydrated chemical solids.

At least two modified procedures are suitable for determining the chemical solids content of the settled solids. The procedures are based on a technique described in Humenick, M.J. and Kaufman, W.J. "An Integrated Biological-Chemical Process for Municipal Wastewater Treatment," Proc. 5th International Water Pollution Research Conference, July-August 1970, Pergamon Press Ltd. (1971). According to this technique, the sample of mixed water and solids is acidified to pH of 2 for 10 minutes before normal filtration and drying. Acidification dissolves the chemical solids without significantly reducing the organic solids, thus providing measures of the MLVSS comparable to those normally used in operating practice. This acid-MLVSS test can be employed in a special test procedure to isolate the chemical solids fraction.

According to the first of the modified procedures, an activated sludge treatment step is operated and stabilized without phosphorous removal and operated and stabilized in a separate but otherwise identical test with phosphorous removal. MLSS and MLVSS determinations are obtained for both modes of operation — the MLSS determinations being made at normal pH and the MLVSS determinations being made using the acid-VSS procedure. The resulting data may be used in formula (1) to determine the chemical solids/total solids weight ratio of the settled solids, as follows:

Let A = MLVSS/MLSS ratio of normal solids without phosphorous removal
B = MLVSS/MLSS ratio of combined solids with phosphorous removal
C = chemical solids expressed as a fraction of the total solids in B Then $$C = 1 - B/A \qquad (1)$$

The foregoing modified procedure is difficult and slow because in a single system, it requires operation and stabilization of an activated sludge process over two periods of time. Even if the periods were consecutive, normal variations in wastewater content and operating conditions would introduce unavoidable error. A preferred modified procedure for determining chemical solids content in the total solids which is simpler, faster and more reliable merely involves making two MLSS determinations at 105°C – one at normal pH ($MLSS_N$) and the other at pH of 2 ($MLSS_2$). The difference between the two tests is accounted for by the chemical solids which are resolubilized under acid conditions. The chemical solids fraction C is calculated as follows:

$$C = (MLSS_N - MLSS_2)/MLSS_N \qquad (2)$$

At the present time, the latter method is the best available for determining chemical solids fraction. Its accuracy depends upon two assumptions: (1) acidification redissolves all the chemical solids, and (2) acidification does not dissolve any inert solids incident in the wastewater. In all probability, neither assumption is 100 percent accurate, but the deviations are probably minor and will not seriously affect the operable range of the invention as affected by determinations of the chemical solids fraction.

The quantity of total solids formed in the first aeration zone and hence the part to be discarded as not needed for recycle, is relatively large as compared with a system wherein a phosphorous-precipitating compound is not added. There are at least two reasons for this phenomena. The high food/biomass ratio maintained in the first aeration zone is conductive to high growth rate of bacteria, and in addition tends to reduce the fraction of total bacteria which are oxidized in this zone by endogenous respiration. Secondly, the phosphorous precipitant gradually increases in the total solids to constitute as much as 50 percent by weight of the total solids. By way of illustration, in the normal practice of the staged oxygen aerated activated sludge system, the excess solids produced for disposal from the system may comprise 0.3–0.6 lbs. solids/lb. $BOD_5$ removed. By comparison, when phosphorous is precipitated in the manner of this invention, the excess total solids removed from the system (both the first and second aeration zones) may comprise 0.8–1.6 lbs./lb. $BOD_5$ removed.

It has been previously indicated that the partially treated effluent water entering the second aeration zone should contain at least 25 ppm. $BOD_5$ (residual carbon food not removed in the first aeration zone), possible residual phosphorous pollutant, and unconsumed phosphorous-precipitating cation. When nitrification is an objective, this partially treated effluent water preferably contains less than 100 ppm. $BOD_5$, so as to permit growth of the nitrogen-consuming microorganisms in the second aeration zone as taught in my parent application Ser. No. 249,159, incorporated herein to the extent pertinent.

When nitrification is not an objective, the second aeration zone may be used to a greater extent for $BOD_5$ removal. In this mode of operation, a relatively high $BOD_5$ content in the partially treated effluent water, such as 125 ppm., is achieved by maintaining the first aeration zone food/biomass ratio near the upper limit of 2.5 pounds $BOD_5$/day × pound MLVSS. The resultant high rate of unrecycled second solids from the second aeration zone is advantageous in suppressing the chemical solids fraction of the total solids in the second aeration zone. This is desirable because high chemical solids content tends to result in a high suspended solids concentration in the product effluent water leaving the second aeration zone (discussed later in detail).

In addition to soluble residual carbonaceous and possible phosphorous pollutants, the partially treated effluent water entering the second aeration zone also contains considerable suspended solids. In fact, the suspended solids content is significantly greater than normally occurs in oxygen gas staged activated sludge system wherein the food/biomass ratio is comparable, i.e. 0.8–2.5, when phosphorous precipitating compounds are not introduced. This increased turbidity is not predictable from the prior art as many investigators have observed that phosphorous-precipitating compounds and flocculation and that heavier dosages reduce turbidity. The higher suspended solids concentration in the partially treated effluent water is believed due to the heavy accumulation of chemical solids in the total solids separated from the first aeration zone, which accumulation occurs after continuous, sustained operation, In effect, the system becomes overburdened with small positively charged particles which inhibit effective flocculation and permit both chemical and organic solids to persist in suspension in the first aeration zone effluent. Unprecipitated cation of the added compound is also carried over into the second aeration zone. However, most of the phosphorous pollutant reacts chemically in the first aeration zone in the presence of excess cation, and its resultant insoluble salts are largely removed in the first step clarification-sedementation.

Despite the large suspended solids increase in the partially treated water which occurs when sustained addition of the phosphorous-precipitating compound is practiced, it has been unexpectedly discovered that a superlative effluent is produced in the second aeration zone when the operating conditions of this method are maintained in the first and second aeration zones. As will be illustrated by the ensuing examples, the product effluent water contains only about 10 ppm. suspended solids and very low residual levels of all pollutants: phosphorous (1 ppm.), nitrogen (1 ppm.) and $BOD_5$ (14 ppm.).

The chemical solids accumulation in the second aeration zone depends at least in part on the food/biomass ratio and the phosphorous-precipitating cation/phosphorous pollutant molar ratio maintained in the first aeration zone. If the last mentioned ratio is relatively high, e.g. 1.6, then relatively more cation carry-over to the second aeration zone will occur and the chemical solids will tend to increase relative to other solids (biological). If the cation/phosphorous pollutant ratio in the first aeration zone is relatively low, e.g. 1.2, the chemical solids concentration in the second aeration zone will also tend to be low, assuming that a polishing dose of the phosphorous-precipitating compound is not introduced directly to the second aeration zone. If the first zone food/biomass ratio is relatively high, e.g. 2.4, then more $BOD_5$ will be carried over to the second aeration zone and the biological solids (carbonaceous and nitrogenous) will tend to increase relative to chemical solids. Low food/biomass ratio in the first aeration zone will produce the opposite effect in the second aeration zone.

If necessary, additional phosphorous-precipitating compound may be directly introduced to the second aeration zone, so as to maintain the phosphorous-precipitating cation concentration so that the chemical solids/total solids weight ratio at least at 0.05 and less than 0.25. The function of the phosphorous-precipitating compound, whether carried over from the first aeration zone or directly added to the second aeration zone, is to aid flocculation — the formation of a moderate fraction of positive changes in the liquor which, in the presence of normally occurring negatively charged biological solids, results in effective "capture" of substantially all the fine solids within large, settleable floc particles. The chemical solids accumulation in the second aeration zone is an indicator of the phosphorous-precipitating cation concentration.

The food/biomass ratio in the second aeration zone is low on an absolute basis (down to 0.15 pounds $BOD_5$/day × pound MLVSS) and relative to the first aeration zone (no more than one half). Low F/M is needed to obtain the phosphorous precipitating cation/biomass relationship needed for exceptional clarity in the product effluent water. Also, if nitrification is an object a low food/biomass ratio is necessary to suppress production of carbonaceous solids and maintain a nitrifying biomass. If nitrification is to be optimized, the food/biomass ratio in the second aeration zone should be within the lower portion of the acceptable range, i.e. 0.15–0.5.

Only the minimum energy required for mixing and fluid recirculation should be expended in the second aeration zone. Floc damage in this zone due to excessive energy would be more detrimental to overall process performance since the product effluent water is normally discharged from the second aeration zone clarifier without further opportunity for reflocculation. More particularly, the total energy expended in the liquor introductory flow section having liquor contact time of at least 10 minutes does not exceed 0.3 horsepower/1,000 U.S. gallons of second aeration zone liquid capacity including a high shear part not exceeding 0.25 horsepower/1,000 U.S. gallons (the upper limit of the first aeration zone liquor terminal flow section).

The energy expenditure in the liquor terminal flow section must be maintained as low as possible (for the above stated reasons) to achieve the necessary liquid-solids mixing and fluid recirculation. In particular, the total energy expended in a liquor terminal flow section of the second aeration zone having liquor contact time of at least 10 minutes does not exceed 0.25 horsepower/1,000 U.S. gallons of second aeration zone liquid capacity including a high shear part not exceeding 0.20 horsepower/1,000 U.S. gallons. These low power levels are feasible inasmuch as oxygen demand is very low in the terminal liquid flow section so that the power requirement is established almost entirely by liquid-solids mixing. Also, the second aeration zone total solids concentration is lower than in the first zone, and the total solids contains a lower fraction of heavy chemical solids thereby facilitating lower power expenditure for liquid-solids mixing.

The total energy requirements of the liquor introductory flow section of the second aeration zone are usually greater than the liquor terminal flow section so that the mixing and fluid recirculation means in the latter may often be operated at the lowest level of the total system, with the upstream means operated at progressively higher power levels.

The pH of the liquor in the second aeration zone is also maintained in the range of 5.5–7.0 and preferably 5.5–6.5 by the dissolved $CO_2$ in the liquor of a closed oxygen aerated systems and if necessary may be partially controlled by regulating the discharge of $CO_2$-containing oxygen-depleted aeration gas from this aeration zone. As in the first aeration zone, the use of at least 50 percent oxygen (by volume) feed gas with a closed overhead gas space will normally permit the maintenance of pH in the desired range without the addition of pH lowering chemicals.

The total liquor contact time in the second aeration zone should not exceed 240 minutes, and may be less if nitrification is not an objective. This time plus the first aeration zone liquor contact time upper limit of 180 minutes affords a total system time not exceeding 420 minutes, considerably less than comparable prior art activated sludge aeration systems removing the same amount of $BOD_5$, nitrogenous and phosphorous pollutants.

The dissolved oxygen concentration in the liquor terminal flow section is maintained at least at 2 ppm. to insure a sufficient oxygen mass transfer driving force and product effluent water which will increase rather than deplete the receiving water's oxygen supply.

As previously indicated, most but not all of the wastewater's phosphorous pollutant is removed as chemical solids in the first aeration zone, and the settled solids from the zone have a chemical solids/total solids weight ratio of at least 0.25. The concentration of chemical solids in the second aeration zone is lower, i.e. the chemical solids/total solids weight ratio is less than 0.25.

Referring now more specifically to the drawings and FIG. 1, wastewater containing carbon food and soluble phosphorous pollutant, as for example municipal sewage, enters the liquor introductory flow section of chamber 10 comprising the first aeration zone, through conduit 11. A source (not shown) of oxygen comprising at least 50 percent oxygen is provided and the oxygen gas is flowed therefrom through conduit 12 having control valve 13 therein to chamber 10. The latter is provided with gas-tight cover 14 to maintain an oxygen-enriched aeration gas environment over the liquor. Recycling first solids are also introduced to chamber 10 through conduit 15, although the wastewater and first solids may be mixed prior to introduction in the chamber if desired.

Chamber 10 is designed so that its length is very large relative to its width and depth. For a given enclosure volume such geometry increases the velocity of liquor flow from the introductory flow section to the liquor terminal flow section, and suppresses backmixing of liquor from downstream sections into upstream sections. In order to achieve a significant plug flow effect without liquor partitions, the length of the tank should be greater than its width and liquor depth dimensions. Usually the width and depth dimensions are similar and do not differ by more than a factor of 2 or 2½. The length of the tank should preferably be at least 10 times the larger of the width and depth dimensions. Thus, a suitable "plug flow" tank geometry, expressed by the dimensional ratio, length : width : liquid depth and illustrating the minimum preferred length, is 20 : 2 : 1.

The aforementioned streams are initimately mixed in chamber 10 by a multiplicity of submerged agitators 16a–c spaced longitudinally from end-to-end of chamber 10 and driven by motors 17a–b through joining shaft means. Oxygen depleted aeration gas is withdrawn at longitudinally spaced locations through conduits 19a–c by separate blowers 20a–c for compression and return through conduits 21a–c to submerged spargers or diffusers 22a–c preferably positioned below corresponding agitators 16a–c. In this manner the aeration gas is continuously recirculated in intimate contact with the liquor in several longitudinally spaced sections in chamber 10. Blowers 20a–c are driven by motors (not illustrated), representing the expended fluid recirculation energy, and are preferably provided with controls to permit adjustment of the rotation speed.

When there are a series of mixing-aerating devices spaced along an elongated tank without liquid partitions as for example chambers 10 and 110 of FIG. 1, the liquor terminal flow section of the zone (either first or second) will be the region of influence of the last device(s) in the series, assuming that such region of influence provides at least the minimum 10-minute liquor contact time. The zone of influence of the last device(s) is dependent upon its power relative to the power of the upstream adjacent mixing-aerating device(s). For example, with reference to FIG. 1 assume the agitator 16c and sparger 22c in the terminal section of the first zone are located a distance A from the terminal wall of tank 10 and a distance B from agitation 16b and sparger 22b. Assume that the input power values to 16c plus 22c and to 16b plus 22b are X and Y, respectively. In the practice of this embodiment of the invention, the section of influence of 16c and 22c will extend upstream toward 16b and 22b, a dimension C which is equal to B times $X/(X+Y)$, and the overall dimension of the terminal section in the longitudinal liquor flow direction is $A + C$, or $A + B$ times $X/(X+Y)$. By multiplying the overall longitudinal dimension by the width and liquor depth of the tank, one obtains volume of the terminal liquor flow section, and by dividing this volume by the rate of liquor throughput (wastewater feed plus solids recycle), the liquor contact time in the terminal section is determined. By dividing the terminal section input power value $X$ by the volume of the terminal section, the power "density" is found (e.g., HP/1,000 gal.).

A phosphorous-precipitating compound, either or both ferric chloride and alum, is introduced preferably in the form of aqueous solution to the liquor terminal flow section of chamber 10 through conduit 50 and control valve 51. Chemical solids are thereby formed in addition to the biological solids, and partially oxygenated liquor is discharged from the terminal flow section over weir 25 into overflow trough 26 and thence through discharge conduit 27. The oxygen-depleted aeration gas may be continuously or intermittently discharged from the overhead space of the liquor terminal flow section through conduit 23 having control valve 24 therein.

The partially oxygenated liquor in conduit 27 is introduced within a central concentric baffle 28 of first clarifier 29. Baffle 28 preferably extends from above the liquid level to a point intermediate to this level and the clarifier's conical bottom. Motor 30 drives a slowly rotating rake 31 across the clarifier bottom to prevent "coning" of the dense settled solids. The supernatent liquid or partially treated effluent water, still with at least 25 ppm. $BOD_5$ and unconsumed phosphorous-precipitating cation, overflows weir 32 into trough 33 and is discharged through conduit 34. The first solids (comprising chemical and biological solids) is withdrawn from the clarifier bottom through conduit 35 and at least a portion thereof is pressurized by pump 36 for recycling in conduit 15 to chamber 10 for inoculation of the incoming wastewater. Any first solids not needed for recirculation are discharged through bottom conduit 37 having control valve 38 therein.

The partially treated effluent water from clarifier 29 comprises the sole liquid feed stream to the second zone. The apparatus previously described in the context of the first aeration zone may be substantially duplicated as the second aeration zone. In FIG. 1, elements corresponding to those previously described have been identified by the same number plus 100, and the second aeration zone operates in an analogous manner to the first aeration zone, except for certain parameters discussed hereinafter in detail. In brief, the partially treated effluent water in conduit 34 having valve 35a therein, enters the liquor introductory section of chamber 110 comprising the second aeration zone and is mixed therein with at least 50 percent (by volume) oxygen feed gas introduced through conduit 112, and second solids recycle introduced through conduit 115. Additional phosphorous precipitating compound may be introduced through conduit 150 and control valve 151 therein, if needed to maintain the chemical solids/total solids weight ratio at least at 0.05 in the second aeration zone.

Chamber 110 is designed in a manner analogous to chamber 10 to approach plug flow of liquor from end-to-end That is, the length is very large compared to its width and depth. As an illustration for approaching plug flow of liquor in a rectangular chamber, the length : width : liquor depth ratios may be about 20 : 2 : 1. Also, longitudinally spaced submerged agitators 116a–c, and aeration gas recirculation assemblies 119, 120, 121 and 122a–c function in an analogous manner to their chamber 10 counterparts. Oxygen-depleted overhead gas is released from the overhead space in the liquor terminal flow section of chamber 110 through conduit 123 and control valve 124 therein. Further oxygenated liquor is discharged from the same liquor terminal flow section through conduit 127 to second clarifier 129 operating in a manner very similar to first clarifier 29. Product effluent water is discharged from the system through conduit 140 and the second solids withdrawn from the bottom through conduit 135. At least part of the latter is recycled through conduit 115 by pump 136 to the liquor introductory section of chamber 110 along with the partially treated wastewater. The balance of the second solids are discharged through conduit 137 and control valve 138 therein.

In a preferred embodiment of this invention, the first aeration zone and the second aeration zone each comprise a multiplicity of separate sub-zones, wherein the oxygen gas, wastewater feed, and first solids recycle are all introduced to a first sub-zone as the liquor introductory flow section of the first aeration zone for mixing and simultaneous fluid recirculation therein to form a first partially oxygenated liquor and a first oxygen-depleted aeration gas. They are separately withdrawn and each introduced to a second sub-zone to form a second partially oxygenated liquor and second further oxygen-depleted aeration gas. These are in turn separately withdrawn from the second sub-zone and each is introduced to any remaining sub-zones of the first aeration zone for further mixing and fluid recirculation in the same cocurrent flow direction as the first and second sub-zones.

The phosphorous-precipitating compound is introduced to the final sub-zone as the aforementioned liquid terminal flow section, and the aeration gas from the final sub-zone is released as the oxygen-depleted-aeration gas.

Oxygen feed gas, partially treated effluent water and second solids recycle are all introduced to a first sub-zone as the liquor introductory flow section of the second aeration zone for mixing and simultaneous fluid recirculation therein to form a first further oxygenated liquor and a first oxygen-depleted aeration gas. They are separately withdrawn and each introduced to a second sub-zone for further mixing and simultaneous fluid recirculation to form a second further oxygenated liquor and a second oxygen-depleted aeration gas. These are in turn separately withdrawn from the second sub-zone and each introduced to any remaining sub-zone of the second aeration zone for further mixing and fluid recirculation in the same cocurrent flow direction as the first and second sub-zones, and aeration gas from the final sub-zone is released as the oxygen-depleted aeration gas.

Figure 2:
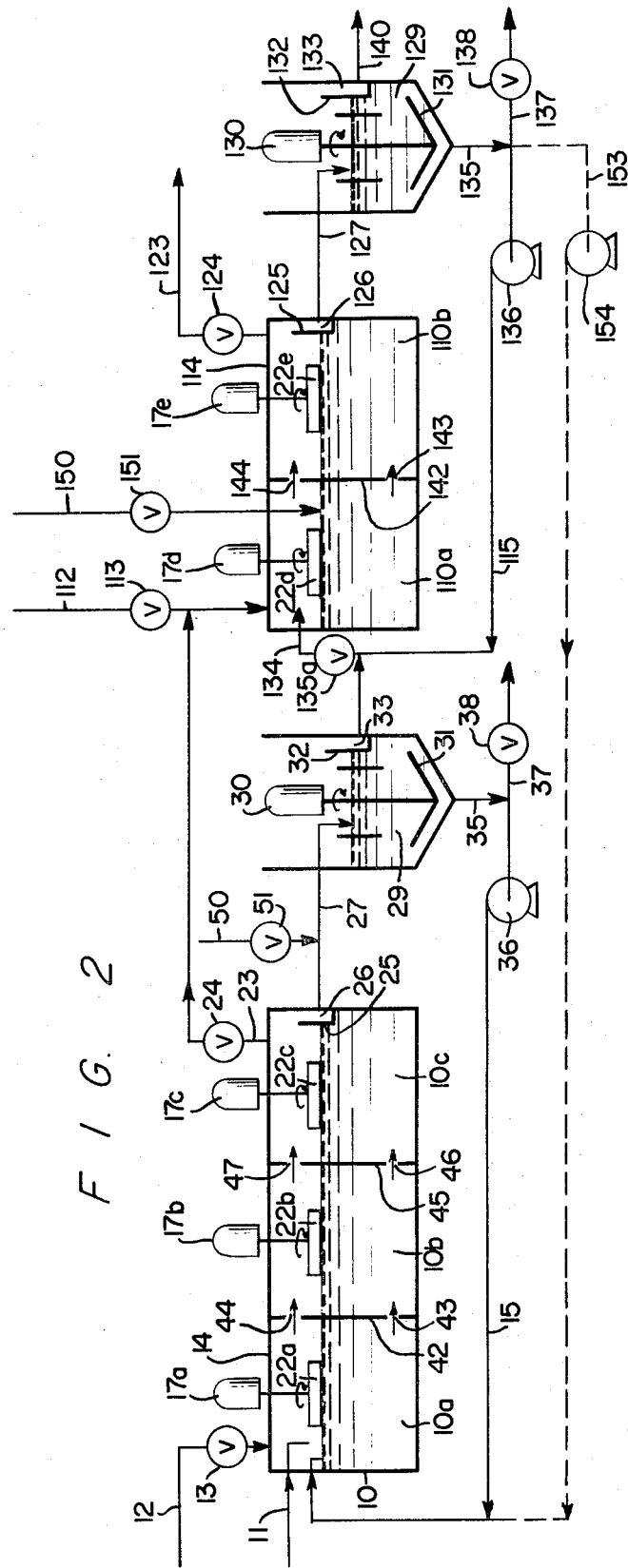
FIG. 2 is a schematic view taken in cross-sectional elevation of apparatus capable of practicing another embodiment wherein the first and second aeration zones each comprise a multiplicity of separate sub-zones providing staged gas-liquor contacting.

Referring now more specifically to the FIG. 2 embodiment employing three sub-zones in the first aeration zone and two sub-zones in the second aeration zone, elements corresponding to FIG. 1 elements have been identified by the same number. First aeration zone 10 is divided into three separate compartments or sub-zones 10a, 10b and 10c by intermediate partitions 42 and 45 extending from top to bottom. Restricted opening 43 in partition 42 below the liquor level provides flow of first partially oxygenated liquor from first sub-zone 10a to second sub-zone 10b, and restricted opening 44 in the aeration gas space provides flow of first oxygen-depleted aeration gas from 10a to 10b in cocurrent flow relation to the liquor. Similarly, restricted opening 46 in partition 45 below the liquor level provides flow of second partially oxygenated liquor from second sub-zone 10b to third sub-zone 10c, and restricted opening 47 in the aeration gas space provides flow of second oxygen-depleted aeration gas from 10b to 10c in cocurrent flow relation to the liquor. Third sub-zone 10c is the liquor terminal flow section of first zone 10, assuming that the liquor contact time in 10c is at least 10 minutes. If the 10c liquor contact time is less than 10 minutes, the liquor terminal flow section also includes 10b so that the 10b and 10c contact times total at least 10 minutes.

Surface-type impellers 22a, 22b and 22c are provided in sub-zones 10a, 10b and 10c respectively to throw sheets of liquor into the gas space for recirculation against the gas and simultaneously perform the liquid-solid mixing function. That is, in the FIG. 1 embodiment, aeration gas is recirculated against the liquor by pumps and reintroduced through sub-surface spargers, while liquid-solid mixing is accomplished by sub-surface propellers. In the FIG. 2 embodiment, both fluid (liquor) recirculation and liquid-solid mixing are provided by the same mechanical device-motor driven surface impellers.

Third partially oxygenated liquor is withdrawn from the liquor terminal flow section 10c through conduit 27 joining first clarifier 29, and the phosphorous-precipitating compound is introduced thereto. As previously indicated, the precipitating reaction with the soluble ferric or aluminum cation is so rapid that very little contact time is needed upstream first clarifier 29.

Also, no mechanical mixing is needed in conduit 27 (often in the form of an open trough), so no external energy is expended in the liquor flow section of the phosphorous-precipitating compound introduction for this embodiment.

The third oxygen-depleted gas from the liquor terminal flow sub-zone 10c is discharged through conduit 23 and control valve 24, and introduced to first sub-zone 110a of the second aeration zone as part of the oxygen aeration gas. This gas still contains a relatively high oxygen concentration. e.g. 60–80% $O_2$ by volume, assuming that the feed gas to the first aeration zone is 90–100% $O_2$. Any balance of the second zone oxygen requirement is introduced to first sub-zone 110a through conduit 112 and control valve 113.

Second aeration zone 110 operates in a manner analogous to first aeration zone 10 except that only one intermediate partition 142 is employed to form first sub-zone 110a and second sub-zone 110b. That is, first further oxygenated liquor flows from 110a to 110b through sub-surface opening 143 in partition 142, and first oxygen-depleted gas flows from 110a to 110b through opening 144 in the overhead gas space.

Both clarifiers 29 and 129 operate in the same manner as in the FIG. 1 embodiment. FIG. 2 does however illustrate the alternative of recycling part of the second solids to the first zone liquor introductory flow section along with the first solids. As previously discussed, the second solids in conduit 135 contains a substantially higher fraction of biological (organic) solids than the first solids in conduit 35. The high accumulation of heavy chemical solids and the resulting high solids waste rate from the first aeration zone tends to decrease the concentration of microorganisms (hence the biological activity) in the first zone liquor. The latter's microorganism concentration (MLVSS) may be supplemented by diverting part of the second solids through conduit 153 from return by pump 154 to conduit 15 and introduction to zone 10a along with the first solids recycle.

The advantages of this invention were demonstrated in a series of pilot plant tests involving single zone 99 percent oxygen (by volume) feed gas aeration without addition of phosphorous-precipitating compound (Test Nos. 1 and 4) and with alum addition (Test Nos. 2 and 3), two-zone 99 percent $O_2$ feed gas aeration without addition of phosphorous-precipitating compound (Test Nos. 5 and 6), with addition of an unsatisfactory phosphorous-precipitating compound, sodium aluminate (Test No. 7) and with the addition of alum as an embodiment of the invention (Test No. 8). In each instance the aeration zone or zones had at least three sub-zones arranged for cocurrent gas-liquor flow in the manner of FIG. 2, with a clarifier joining the liquor terminal portion. Each sub-zone was equipped with an oxygen gas sparger-impeller gas and liquor mixing unit driven by an electric motor. The sparger consisted of rotating arms equipped with small diameter orifices through which the oxygen gas was recirculated, similar to FIG. 1 except that impeller 16 and sparger 22 were mounted on a common shaft for rotation. The alum was added to only the last sub-zone of the single aeration zone in Test Nos. 2 and 3, and the sodium aluminate and alum were added to only the last sub-zone of first aeration zone in Test Nos. 7 and 8, respectively.

The pilot plants used in Test Nos. 1–8 were four different types as follows in Table A.

TABLE A

| | Test No. | | | |
|---|---|---|---|---|
| | 1 | 2 | 3, 4 | 5, 6, 7, 8 |
| Sub-zone vol., U.S. gallons | 400 | 2050 | 50 | 45 |
| No. of sub-zones | 4 | 4 | 4 | 2 (1st zone) 3 (2nd zone) |
| Total zone vol., U.S. gallons | 1600 | 8200 | 200 | 90 (1st zone) 135 (2nd zone) |
| Liquor depth, ft. | 5.17 | 11.58 | 2.25 | 2 |
| Sub-zone dimensions (ft. length x width x height) | 3.16 x 3.41 x 6.5 | 4.5 x 5.3 x 13.5 | 1.87 diam. x 2.0 side wall depth | 1.87 diam. x 2.9 side wall depth |
| Rotating sparger orifice size and diameter, inches | 1/8, 13 7/8 | 1/8, 14 | 1/8, 6 | 1/8, 6 |
| Horsepower, motors for rotating spargers (installed) | 3/4 (each sub-zone) | 3 (1st sub-zone) 2 (other sub-zones) | 1/3 (each sub-zone) | 1/3 (each sub-zone) |
| RPM, rotating spargers | 190 | 230 | 200 (1st sub-zone) 150 (other sub-zones) | 250 (1st sub-zone of zones 1 and 2) 250 (other sub-zones) |
| Horsepower, motors for recirculating gas (installed) | 2/3 (1st sub-zone) 1/3 (other sub-zones) | 2/3 (1st sub-zone) 1/2 (other sub-zones) | 1/8 (each sub-zone) | 1/20 (each sub-zone) |
| Impeller diameter, inches | 14 | 14 | 6 | 6 |

During pilot plant operation, the oxygen feed gas was introduced to the overhead space of the first subzone of each zone and maintained at slightly above atmospheric pressure and passed to succeeding sub-zones through interconnecting piping. Gas purities were measured with an oxygen analyzer and the waste gas from each of the two zones during these tests was greater than 20 percent (by volume). However, efficient oxygen utilization was not an object of these pilot plant tests and more oxygen was wasted than would be tolerated in full-size plants. Moreover the pilot plants were not designed and operated to minimize energy consumption, and the observed horsepower values (per 1,000 gallons liquid capacity) were substantially higher than would be expected in full-size plants. The temperature of the mixed liquor was 8–26°C. and the pH in the range of 6.3–7.1. In addition to the monitoring of gas and liquor flows by appropriate metering and recording equipment, several important parameters were measured to determine the system performance. Daily composite samples were obtained for the feed water, the first step clarifier effluent and the second step clarifier effluent. Grab sample composite of the mixed liquor sludge were taken daily for each step, and all analytical procedures for the samples were in accordance with the previously referenced "Standard Methods for the Examination of Water and Wastewater." The data from the tests is summarized in Table B.

Table 1 summarizes the data from these tests. Test No. 1 shows that in single zone high purity oxygen aerated plants designed in accordance with U. S. Pat. No. 3,547,815, a high degree of carbonaceous removal (97% $BOD_5$) may be achieved with low total suspended solids (MLSS) in the effluent water (15 ppm). Test Nos. 2 and 3 show that when alum is added to such plants for removal of phosphorous removal, the total suspended solids concentration in the effluent water is high, i.e., 33 ppm. and 85 ppm., indicating poor chemical solids flocculation in a single zone — combined solids system. Test No. 4 involves the same wastewater and pilot plant as Test No. 3 but without alum addition. That is, alum was added to the mixed liquor during the

TABLE B

| Test No. | 1 | 2 | 3 | 4 | 5 Zone 1 | 5 Zone 2 | 6 Zone 1 | 6 Zone 2 | 7 Zone 1 | 7 Zone 2 | 8 Zone 1 | 8 Zone 2 |
|---|---|---|---|---|---|---|---|---|---|---|---|---|
| Feed: | | | | | | | | | | | | |
| $BOD_5$, ppm | 227 | 114 | 99 | 113 | 110 | 69.5 | 119 | 27.7 | 110.2 | 27.4 | 106 | 45.3 |
| TSS, ppm | 76 | 126 | 112 | 123 | 126 | 54 | 150 | 49 | 124.3 | 65.8 | 118.5 | 70.3 |
| TP, ppm[1] | 5.8 | 27 | 3.7 | – | – | – | – | – | 7.0 | 3.6 | 6.3 | 4.0 |
| TKN, ppm[2] | 38 | 28 | 11 | 22 | 27 | 22.5 | 27 | 19.5 | 20.2 | 15.2 | 19.7 | 18.0 |
| Effluent: | | | | | | | | | | | | |
| $BOD_5$, ppm | 8.0 | 13 | 36 | 32 | 69.5 | 22.5 | 27.7 | 11.8 | 27.4 | 28.0 | 45.3 | 14.1 |
| TSS, ppm | 15 | 33 | 85 | 55 | 54 | 45 | 49 | 30 | 65.8 | 42.4 | 70.3 | 10.7 |
| TP, ppm[1] | 3.8 | 7.3 | 1.9 | – | – | – | – | – | 3.6 | 2.8 | 4.0 | 1.0 |
| TKN, ppm[2] | 25 | 15 | 8 | 19 | 22.5 | 5 | 19.5 | 3.3 | 15.2 | 1.6 | 18.0 | 1.3 |
| Process conditions: | | | | | | | | | | | | |
| F/M, lbs. $BOD_5$/lb. MLVSS | 0.50 | 0.26 | 0.35 | 0.45 | 0.90 | 0.22 | 1.19 | 0.14 | 1.34 | 0.12 | 1.30 | 0.23 |
| RT first sub-zone, min[3] | 23 | 22 | 26 | 26 | 11 | 21 | 12 | 18 | 12 | 19 | 22 | 19 |
| RT last sub-zone, min[3] | 23 | 22 | 26 | 26 | 11 | 21 | 12 | 18 | 12 | 19 | 22 | 19 |
| RT total, min[3] | 92 | 88 | 105 | 103 | 22 | 62 | 23 | 55 | 24 | 57 | 24 | 57 |
| MLSS, ppm | 7010 | 8160 | 4650 | 3700 | 6779 | 5961 | 6431 | 4134 | 5892 | 5425 | 5489 | 4805 |
| MLVSS, ppm | 5690 | 5410 | 3080 | 2780 | 5890 | 4365 | 4897 | 3128 | 3932 | 3612 | 3983 | 3128 |
| DO, ppm | 7.8 | 4.0–8.0 | 8.1 | 7.7 | 4.3 | 8.0 | 9.0 | 7.4 | 9.1 | 9.8 | 9.4 | 10.3 |
| SVI, ppm[4] | 42.1 | 53 | 70 | 55 | 24.9 | 24 | 28 | 32.4 | 27.2 | 51.8 | 23.4 | 47.6 |
| Temperature (ave.), °C | 26 | 25 | 8 | 9 | 16 | 16 | 19 | 19 | 15.5 | 15.5 | 15 | 15 |
| SRT, days[5] | 7.2 | 5 | 3.7 | 4.0 | 1.1 | 9.0 | 1.0 | 8.1 | 0.84 | 10 | 0.66 | 4.8 |
| Test Duration, days | 40 | 25 | 9 | 9 | 4 | 4 | 7 | 7 | 10 | 10 | 8 | 8 |
| ISV, ft/hr[6] | 10.6 | 7.5 | 5.5 | 8.6 | 7.4 | 11.0 | 7.9 | 9.0 | 8.2 | – | 8.9 | 5.8 |
| Al/P, mole/mole | 0 | 1.33 | 1.4 | 0 | 0 | 0 | 0 | 0 | 2.34 | – | 1.75 | – |
| Total energy in last sub-zone, HP/1,000 U.S. gallons | 0.76 | – | 0.026 | 0.028 | 0.125 | 0.072 | 0.085 | 0.105 | 0.085 | 0.065 | 0.092 | 0.123 |
| High shear part of total energy in last sub-zone, HP/1,000 U.S. gallons | 0.18 | – | 0.004 | 0.004 | 0.012 | 0.012 | 0.012 | 0.012 | 0.012 | 0.012 | 0.012 | 0.012 |
| Total energy in first sub-zone, HP/1,000 U.S. gallons | 0.81 | – | 0.054 | 0.872 | 0.164 | 0.118 | – | 0.144 | 0.184 | 0.118 | 0.184 | 0.138 |
| High shear part of total energy in first sub-zone, HP/1,000 U.S. gallons | 0.17 | – | 0.011 | 0.011 | 0.023 | 0.023 | – | 0.023 | 0.023 | 0.023 | 0.023 | 0.023 |
| Chemical solids/total solids in settled solids in treatment zone | 0 | 0.44 | 0.23 | 0 | 0 | 0 | 0 | 0 | 0.31 | 0.28 | 0.27 | 0.23 |

[1] Total phosphorous content.
[2] Total nitrogen contact.
[3] Total liquor contact time, feed plus recycle.
[4] Sludge volume index.
[5] Sludge retention time.
[6] Settling rate of liquor to clarifier.

nine consecutive day Test No. 3 at an aluminum cation/phosphorous pollutant molar ratio of 1.4. Test No. 4 followed immediately for nine consecutive days and without alum addition. It is evident that the effluent water total suspended solids dropped significantly when alum addition was termined (85 to 55 ppm.).

Test Nos. 5–8 were all conducted in the same pilot plant having two separate aeration zones, and processing the same municipal wastewater. The only process parameter intentionally varied was the food/biomass ratio (F/M). In every instance the ratio was relatively high in the first zone (0.90–1.34) and relatively low in the second zone (0.12–0.23) so that effective nitrification was achieved in Test Nos. 5 and 6 where chemical solids were not produced. However, the first zone effluent water in Test Nos. 5 and 6 contained relatively high total solids concentration (54 and 49 ppm.), and only marginal improvement was obtained in the second aeration zone without alum addition. In Test No. 5 the second zone effluent still contained 45 ppm. total suspended solids (a 16.6 percent reduction within that zone), and in Test No. 6 the second zone effluent still contained 30 ppm. total suspended solids (a 33.3 percent reduction).

Test No. 7 shows that under the conditions of this process, sodium aluminate $NaAl(OH)_4$ is not a satisfactory phosphorous-precipitating compound even though it has been commercially used in other wastewater treatment systems for this purpose. In particular, heavy dosages were required in order to obtain complete reaction of the phosphorous (Al/P molar ratio = 2.35), but the chemical solids in the first zone appear to flocculate and settle very poorly (effluent total suspended solids = 65.8 ppm.), and the improvement in the second zone effluent was limited (42.4 ppm. or 35 percent).

In Test No. 8 conducted according to this invention, alum was added to the liquor terminal flow section of the first zone so as to maintain an aluminum cation/phosphorous pollutant molar ratio (Al/P) of 1.75. The abrupt increase in first zone effluent total suspended solids concentration from 54 ppm. (Test No. 5) to 70.3 ppm. is striking and demonstrates the impairment in flocculation due to heavy accumulation of chemical solids in that zone. Moreover the 45.3 ppm. $BOD_5$ carryover from the first zone to the second zone reflected the high food/biomass ratio (1.30 lbs. $BOD_5$/lb. MLVSS) in the first zone. Despite impairment of flocculation in the first zone, flocculation improved remarkably in the second zone. Suspended solids dropped 85 percent to only 10.7 ppm., representing a 3 to 4 fold improvement over performance in the two-zone Test Nos. 5–7 and a 50–80 percent improvement over the single zone Test Nos. 1–4 in terms of the total suspended solids concentration in the effluent water. To the best of my knowledge, such high overall effluent water quality has not been achieved in wastewater treatment systems employing combined chemical-organic sludges. Other tests have established that results similar to those of Test No. 8 can be achieved when ferric chloride is substituted for alum as the phosphorous-precipitating compound.

It is also evident from comparison between Test No. 8 and single aeration zone Test Nos. 1–4 that the total aeration chamber volume required for two zone aeration to remove all pollutants according to this invention is about the same as required to only remove carbonaceous pollutants in a single aeration zone. That is, the volume of aeration tankage is directly reflected in the liquor contact time (R T), other parameters being equal, the total liquor contact time for Test No. 8 (24 + 57 = 81 minutes) was lower than the Test Nos. 1–4 (88 – 103 minutes).

Although certain embodiments of this invention have been described in detail, it will be appreciated that other embodiments are contemplated along with modifications of the disclosed features, as being within the scope of the invention.

I claim:

1. In a method for treating wastewater by aeration in contact with activated sludge, settling sludge from the aeration and recycling sludge to the aeration zone as said activated sludge wherein the carbon food in said wastewater is biochemically oxidized with at least 50 percent oxygen (by volume) feed gas, the improvement of phosphorous pollutant removal comprising: introducing a wastewater feed stream containing carbon food and soluble phosphorous pollutant, at least 50 percent oxygen (by volume) feed gas and first solids recycle to a first aeration zone having a closed overhead gas space and mixing the fluids in said first aeration zone while simultaneously recirculating one fluid against the other fluids; introducing a phosphorous-precipitating compound selected from the group consisting of ferric chloride and aluminum sulfate; said introducing, mixing and recirculating being at rates such that: (a) insoluble chemical solids are produced including precipitating phosphorous salt, and the phosphorous-precipitating cation/phosphorous pollutant molar ratio is 1.2–1.8, (b) the food/biomass ratio is maintained at 0.8–2.5 pounds $BOD_5$/day × pound volatile suspended solids (MLVSS), (c) the volatile suspended solids concentration (MLVSS) is at least 2,000 ppm., (d) the total mixing and fluid recirculation energy expended in a liquor terminal flow section of said first aeration zone having liquor contact time of at least 10 minutes does not exceed 0.3 horsepower/1,000 U.S. gallons of terminal flow section liquid capacity including a high shear part of said total mixing and recirculation energy not exceeding 0.25 horsepower/1,000 U.S. gallons, (e) the total mixing and fluid recirculation energy expended in the liquor flow section of said phosphorous-precipitating compound introduction does not exced 0.3 horsepower/1,000 U.S. gallons of said liquor flow section liquid capacity including a high shear part of said total mixing and recirculation energy not exceeding 0.25 horsepower/1,000 gallons, (f) the dissolved oxygen concentration in said liquor terminal flow section is at least 2 ppm., (g) the pH of said liquor in said first aeration zone is 5.5–7.0, and (h) the total liquor contact time in said first aeration zone does not exceed 180 minutes; releasing oxygen-depleted aeration gas of at least 20 percent oxygen (by volume) content from the first aeration zone overhead gas space; discharging partially oxygenated liquor from said first aeration zone and separating same into partially treated effluent water still containing at least 25 ppm. $BOD_5$ and unconsumed phosphorous-precipitating cation, and settled solids having a chemical solids/total solids weight ratio of at least 0.25; returning part of the settled solids to said first aeration zone as said first solids recycle; introducing, said partially treated effluent water, at least 50 percent oxygen (by volume) feed gas, and second solids recycle to a second aeration zone having a closed overhead gas space and mixing the fluids in said second aeration zone and maintaining the phosphorous-precipitating cation concentration so that the chemical solids/total solids weight ratio in said second aeration zone is at least 0.05 while simultaneously recirculating one fluid against the other fluids at rates such that: (i) additional insoluble chemical solids are formed from said phosphorous-precipitating compound, (j) the food/biomass ratio is maintained at 0.15–0.8 pounds $BOD_5$/day × pound volatile suspended solids (MLVSS) and the ratio of first to second aeration zone food/biomass ratio is at least 2, (k) the total mixing and fluid recirculation energy in the liquor introductory flow section of said second aeration zone having liquor contact time of at least 10 minutes does not exceed 0.30 horsepower/1,000 U.S. gallons of introductory flow section liquid capacity including a high shear part of said total mixing and fluid recirculation energy not exceeding 0.25 horsepower/1,000 U.S. gallons, (l) the total mixing and fluid recirculation energy expended in a liquor terminal flow section of said second aeration zone having a liquor contact time of at least 10 minutes does not exceed 0.25 horsepower/1,000 U.S. gallons of terminal flow section liquid capacity including a high shear part of said total mixing and fluid recirculation energy not exceeding 0.20 horsepower/1,000 U.S. gallons, (m) the pH of said liquor in said second aeration zone is 5.5–7.0, (n) the dissolved oxygen concentration in said liquor terminal flow section is at least 2 ppm. and (o) the total liquor contact time in said second aeration zone does not exceed 240 minutes; releasing oxygen-depleted aeration gas of at least 20 percent (by volume) content from the second aeration zone overhead gas space; discharging further oxygenated liquor from said second aeration zone and separating same into product effluent water and settled solids having chemical solids/total solids weight ratio of less than 0.25; and returning part of the settled solids to said second aeration zone as said second solids recycle.

2. A method according to claim 1 wherein said wastewater feed stream also contains nitrogen food, the food/biomass ratio (b) in said first aeration zone is less than 1.5 pounds $BOD_5$/day × pound volatile suspended solids (MLVSS), the partially treated effluent water from said first aeration zone contains less than 100 ppm. $BOD_5$ and at least most of said nitrogen food, the food/biomass ratio (j) in said second aeration zone is less than 0.5 pounds $BOD_5$/day × pound volatile suspended solids (MLVSS), the volatile suspended solids population of said further oxygenated liquor comprises both 2–40 percent nitrogen-consuming microorganisms and 98–60 percent carbon-consuming microorganisms plus non-viable material so that substantial nitrification occurs in said second aeration zone.

3. A method according to claim 1 wherein the total mixing and fluid recirculation energy expended in the liquor introductory flow section of said first aeration zone is at least 1.1 times the total mixing and fluid recirculation energy expended in said liquor terminal flow section of said first aeration zone.

4. A method according to claim 1 wherein the phosphorous-precipitating compound is introduced in said liquor terminal flow section of said first aeration zone.

5. A method according to claim 1 wherein additional phosphorous-precipitating compound is introduced to said second aeration zone.

6. A method according to claim 1 wherein said first aeration zone and said second aeration zone each comprise a multiplicity of separate sub-zones; said oxygen feed gas wastewater feed stream and first solids recycle are all introduced to a first sub-zone as said liquor introductory flow section of said first aeration zone for mixing and simultaneous fluid recirculation therein to form a first partially oxygenated liquor and a first oxygen-depleted aeration gas, said first partially oxygenated liquor and said first oxygen-depleted aeration gas are separately with-drawn and each introduced to a second sub-zone for further mixing and simultaneous fluid recirculation to form a second partially oxygenated liquor and second further oxygen-depleted aeration gas, said second partially oxygenated liquor and said second further oxygen-depleted aeration gas are separately withdrawn from said second sub-zone and each introduced to any remaining sub-zones of said first aeration zone for further mixing and fluid recirculation in the same cocurrent flow direction as said first and second sub-zones, said phosphorous-precipitating compound is introduced to the final sub-zone as said liquor terminal flow section, the aeration gas from the final sub-zone is released as said oxygen-depleted aeration gas; said oxygen feed gas, partially treated effluent water and second solids recycle are all introduced to a first sub-zone as said liquor introductory flow section of said second aeration zone for mixing and simultaneous fluid recirculation therein to form a first further oxygenated liquor and a first oxygen-depleted aeration gas, said first further oxygenated liquor and said first oxygen-depleted aeration gas are separately withdrawn and each introduced to a second sub-zone for further mixing and simultaneous fluid recirculation to form a second further oxygenated liquor and a second oxygen-depleted aeration gas, said second further oxygenated liquor and said second oxygen-depleted aeration gas are separately withdrawn from said second sub-zone and each introduced to any remaining sub-zones of said second aeration zone for further mixing and fluid recirculation in the same cocurrent flow direction as said first and second sub-zones, the aeration gas from the final sub-zone is released as said oxygen-depleted aeration gas.

7. A method according to claim 1 wherein the total mixing and fluid recirculation energy expended in said first aeration zone liquor terminal flow section does not exceed 0.25 horsepower/1,000 U.S. gallons including a high shear part of such energy not exceeding 0.20 horsepower/1,000 U.S. gallons.

8. A method according to claim 1 wherein the total mixing and fluid recirculation energy expended in said second aeration zone liquor terminal flow section does not exceed 0.20 horsepower/1,000 U.S. gallons including a high shear part of such energy not exceeding 0.15 horsepower/1,000 U.S. gallon.

9. A method according to claim 1 wherein the total mixing and fluid recirculation energy expended in the first aeration zone liquor introductory flow section does not exceed 0.50 horsepower/1,000 U.S. gallons.

10. A method according to claim 1 wherein the food/biomass ratio (b) in said first aeration zone is less than .15 pounds $BOD_5$/day × pound volatile suspended solids (MLVSS).

11. A method according to claim 2 wherein the food/biomass ratio (g) in said second aeration zone is less than 0.5 pounds $BOD_5$/day × pound volatile suspended solids (MLVSS).

12. A method according to claim 1 wherein ferric chloride is said phosphorous-precipitating compound.

13. A method according to claim 1 wherein aluminum sulfate is said phosphorous-precipitating compound.

14. A method according to claim 1 wherein the pH of the liquor in said first and second aeration zones is 6.0–6.7.

15. A method according to claim 1 wherein the settled solids from said first aeration zone has a chemical solids/total solids weight ratio of less than 0.50.

* * * * *

UNITED STATES PATENT OFFICE
CERTIFICATE OF CORRECTION

Patent No. 3,764,524     Issue Date October 9, 1973

Inventor(s) Micahel J. Stankewich, Jr.

It is certified that error appears in the above-identified patent and that said Letters Patent are hereby corrected as shown below:

Claim 1, column 24, line 46 "exced" should read --exceed--.

Claim 10, column 26, line 63 ".15" should read --1.5--.

Claim 11, column 26, line 65, "2" should read --1--.

Signed and sealed this 5th day of February 1974.

(SEAL)
Attest:

EDWARD M. FLETCHER, JR.
Attesting Officer

RENE D. TEGTMEYER
Acting Commissioner of Patent